(12) United States Patent
Huh

(10) Patent No.: US 7,688,037 B2
(45) Date of Patent: Mar. 30, 2010

(54) CHARGING CONTROL APPARATUS AND METHOD OF MOBILE TERMINAL

(75) Inventor: Sae Hwan Huh, Osan-si (KR)

(73) Assignee: LG Electronics, Inc., Seoul (KR)

( * ) Notice: Subject to any disclaimer, the term of this patent is extended or adjusted under 35 U.S.C. 154(b) by 196 days.

(21) Appl. No.: 11/533,341

(22) Filed: Sep. 19, 2006

(65) Prior Publication Data

US 2007/0120531 A1    May 31, 2007

(30) Foreign Application Priority Data

Nov. 28, 2005    (KR) .................. 10-2005-01139573

(51) Int. Cl.
*H02J 7/00* (2006.01)
(52) U.S. Cl. .................. 320/138; 320/112; 320/114
(58) Field of Classification Search ......... 320/112–114, 320/137–138
See application file for complete search history.

(56) References Cited

U.S. PATENT DOCUMENTS 5,187,425 A * 2/1993 Tanikawa ............... 320/138
6,107,782 A * 8/2000 Imai et al. ............... 320/150
6,614,206 B1 * 9/2003 Wong et al. ............ 320/136
2007/0001646 A1 * 1/2007 Kojima ................ 320/128

FOREIGN PATENT DOCUMENTS

KR    10-2004-0092265    11/2004
KR    20-0371116    12/2004

OTHER PUBLICATIONS

Office Action from Korean Patent Office, dated May 17, 2007, with English translation, 4 pages.

* cited by examiner

*Primary Examiner*—Edward Tso
*Assistant Examiner*—Samuel Berhanu
(74) *Attorney, Agent, or Firm*—Fish & Richardson P.C.

(57) ABSTRACT

Provided are a charging control apparatus and method of a mobile terminal, capable of charging a battery at different charging current rates according to a charging mode of an input power. The charging control apparatus includes: a battery; an external port connector configured to receive power of an external port or adaptor through a single source power rail; a voltage detector configured to detect a voltage inputted through the external port connector and a voltage of the battery; a microcontroller configured to change a charging current rate using the detected input voltage and the detected battery voltage; and a charging unit configured to control a charging of the battery according to the varied charging current rate.

25 Claims, 6 Drawing Sheets

CHARGING CONTROL APPARATUS AND METHOD OF MOBILE TERMINAL

BACKGROUND OF THE INVENTION

1. Field of the Invention

The present invention relates to a mobile terminal, and more particularly, to a charging control apparatus and method of a mobile terminal, capable of charging the mobile terminal at different charging rates according to charging modes of an input voltage.

2. Description of the Related Art

Recently, MPEG layer-3 (MP3) players are actively developed which can replay music alone and also download music data to be replayed from a personal computer (PC) or Internet site through media, such as a transmission cable, and can be stored in a memory device.

Compared with the existing compact disk (CD) players, the MP3 players can be miniaturized and can delete and record data from and on the memory device at any time. Also, the MP3 players can enhance memory capacity and have a variety of functions such as broadcasting reception and viewing.

Meanwhile, the MP3 players are supplied with power from regular batteries (AA size, AAA size, etc.). Also, an internal battery installed inside the MP3 player is charged by a charging current applied through a power adaptor and is used as a power source.

Meanwhile, the recent MP3 players have universal serial bus (USB) ports that enable stored sound source data to be replayed, or enable sound source data to be received from other media. The USB port can be built in the body of the MP3 player, or connected to USB cable. To solve inconvenience to carry the USB cable and prevent missing the USB cable, MP3 players with a built-in USB cable are recently available in the markets. A charging current is also supplied through the USB and thus the internal battery built in the MP3 player is charged.

Meanwhile, a stereo speaker is provided in a body so as to listen to music vividly by replaying bass and clear original sound when reproducing digitalized sound source data. MP3 players with the USB port as well as the stereo speaker built in the body draw consumer's attraction.

FIG. 1 is a block diagram of a charging control apparatus of a related art portable audio player.

Referring to FIG. 1, a USB port 102 is connected to a communication port of a computer and is supplied with a charging current. The USB port 102 is also used to download sound source data. An external input port 104 is supplied with a charging current through the medium of AC/DC adaptor 101 for converting household AC power into DC voltage of a predetermined level necessary for charging. A selector 110 sets a supply path of a charging voltage by selecting one of the USB port 102 and the external input port 104. Also, when a charging current is supplied through one of the USB port 102 and the external input port 104 in a state in which the ports 102 and 104 are all connected, the selector 110 having a mixer function sets two supply paths of the charging path such that a charging current supplied from another port can be used when the charging current is insufficient. A charging controller 120 controls the battery's charging of the charging current applied through the supply path selected by the selector 110 and the charging current applied by the mixer function. A controller 140 controls a series of operations of receives a charging information about the charging state of the internal batter 130 from the charging controller 120, and displaying the charging information on a display device 150.

The display device 150 can display the charging information of the internal battery 130, such as "under charging" and "charging completed". Also, the charging information can be displayed in various methods. For example, the charging state can be displayed in percentage (%) or bar graph.

The charging operation of the charging control apparatus will be described below. The internal battery 130 built in the body of the MP3 player is charged using one of the USB port 102 and the external input port 104.

First, when the USB port 102 is connected to the communication port of the computer, the charging controller 120 activates the corresponding charging path such that the charging current is supplied through the USB port 102 by the selecting function of the selector 110. That is, when the USB port 102 is connected to the communication port, the generation of a relatively high voltage than that of the external input port 104 is detected according to the voltage detection of a voltage detector (e.g., a diode (not shown)) provided inside the selector 110. In this manner, the charging path through the USB port 102 is automatically selected.

The charging current of a predetermined level from the computer is applied through the USB port 102. Then, the applied charging current is transferred to the internal battery 130 by the charging controller 120, thereby completing the charging operation.

During the charging operation, the controller 140 receives the charging state information of the internal battery 130 from the charging controller and displays it on the display device 150. For example, the charging information is displayed like the text "under charging" or "charging completed" or graph.

Second, when the external input port 104 instead of the USB port 102 is connected to the AC/DC adaptor 101, the charging controller 120 activates the corresponding charging path such that the charging current is supplied through the external input port 104 by the selecting function of the selector 110. Then, the AC/DC adaptor 101 converts AC power applied through a connection plug into voltage necessary for the MP3 player, and the charging controller 120 transfers it to the internal battery 130, thereby completing the charging operation. Also, in this case, the controller 140 enables the charging information of the internal battery 130 to be displayed on the display 150.

In other words, when the USB port 102 or the external input port 104 is connected to the computer communication port or the AC/DC adaptor 101, the charging path with high voltage is selected by the voltage detecting function of the selector 110. The internal battery 130 built in the MP3 player can be charged by the charging current supplied through the selected charging path.

However, the conventional charging control apparatus of the portable audio player charges a constant charging current rate even though the power is supplied from the adaptor or through the USB port. Also, the charging is performed with the identical charging current regardless of the battery voltage. Consequently, there is a problem in that a total charging time becomes longer.

SUMMARY OF THE INVENTION

Accordingly, the present invention is directed to a charging control apparatus and method of a mobile terminal that substantially obviates one or more problems due to limitations and disadvantages of the related art.

An object of the present invention is to provide a charging control apparatus and method of a mobile terminal, capable of charging a battery at different charging current rates according to an input power source.

Another object of the present invention is to provide a charging control apparatus and method of a mobile terminal, capable of automatically selecting a charging mode by using an adaptor power or external port power inputted as a single input power source.

A further another object of the present invention is to provide a charging control apparatus and method of a mobile terminal, capable of automatically selecting a charging mode by using a power inputted as a plurality of input power sources.

A further object of the present invention is to provide a charging control apparatus and method of a mobile terminal, capable of reducing a battery charging time by changing a charging current rate of a battery in at least two stages according to an input power source.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a charging control apparatus of a mobile terminal, including: a battery; an external port connector configured to receive power of an external port or adaptor through a single source power rail; a voltage detector configured to detect a voltage inputted through the external port connector and a voltage of the battery; a microcontroller configured to change a charging current rate using the detected input voltage and the detected battery voltage; and a charging unit configured to control a charging of the battery according to the varied charging current rate.

In another aspect of the present invention, there is provided a charging control apparatus of a mobile terminal, including: a battery; a voltage detector configured to detect a voltage inputted through an external port and a voltage of the battery; a microcontroller configured to set different charging current rates according to the battery voltage with reference to the input voltage detected by the voltage detector; and a charging unit configured to charging the battery at the set charging current rate by using the input voltage.

In a further another aspect of the present invention, there is provided a charging control method of a mobile terminal, including: determining a battery charging mode by a signal inputted through an external port; if the battery charging mode is determined, checking a voltage of a battery; and charging the battery at different charging current rates according to the battery charging mode and the battery voltage.

The charging of the battery may include: when the battery voltage is lower than a first reference voltage, charging the battery using a first charging current; and when the battery voltage is higher than the first reference voltage, charging the battery using a second charging current or a third charging current according to the battery charging mode.

According to the present invention, the battery charging time can be reduced by charging the battery at different charging current rates. Also, the battery charging time can be reduced by automatically distinguishing the charging modes according to the external input power and changing the charging current rate according to the distinguished charging modes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a charging control apparatus and method of a mobile terminal according to the present invention will be described in detail with reference to the accompanying drawings.

Figure 1:
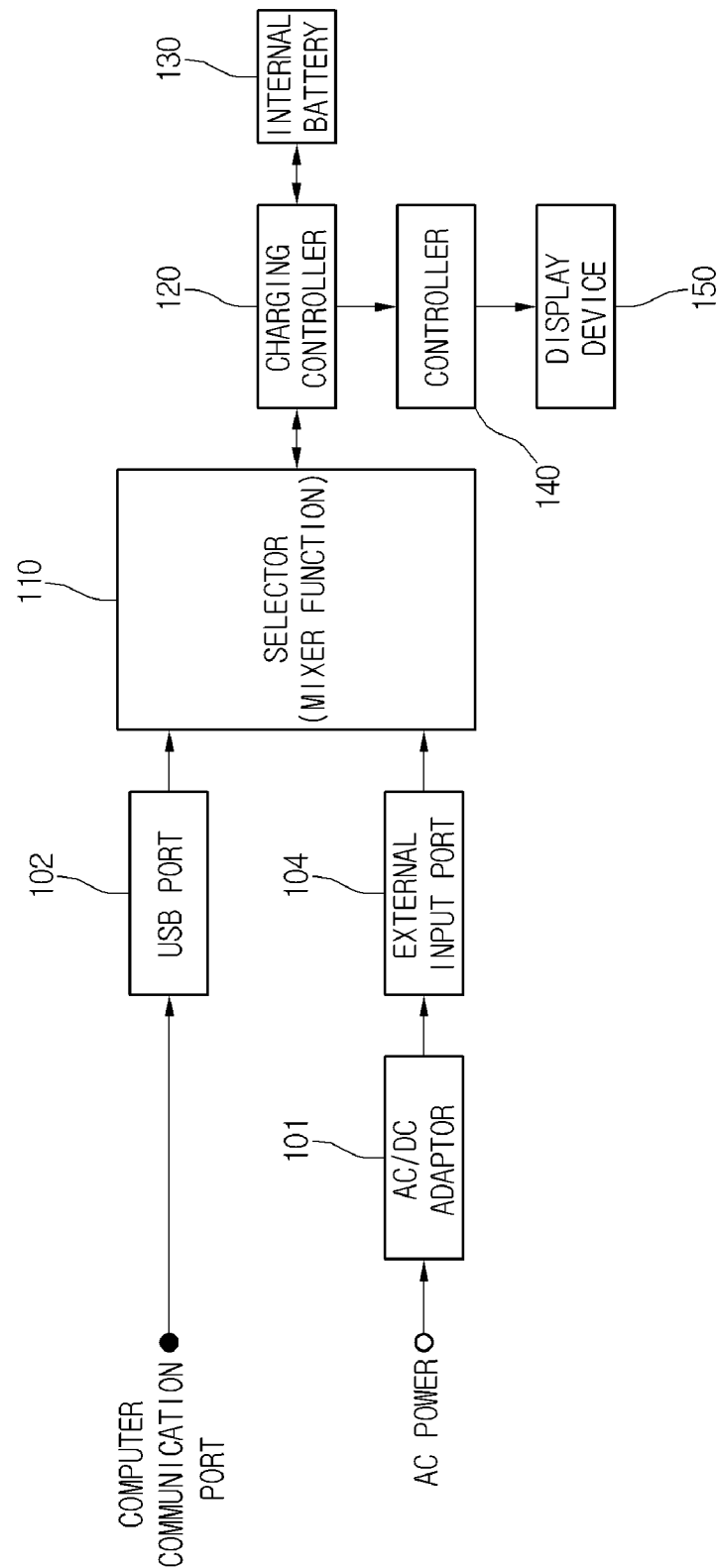
FIG. 1 is a block diagram of a related art charging control apparatus of a mobile terminal.
Figure 2:
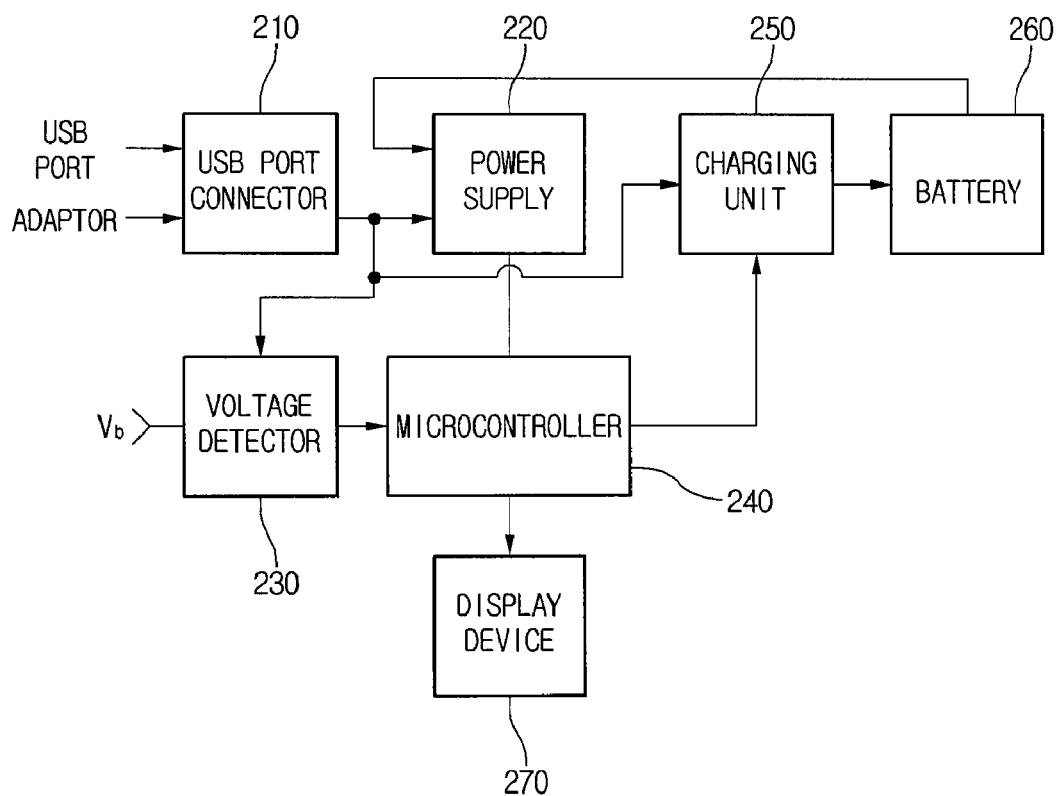
FIG. 2 is a block diagram of a charging control apparatus of a mobile terminal according to an embodiment of the present invention.

FIG. 2 is a block diagram of a charging control apparatus of a mobile terminal according to an embodiment of the present invention.

Referring to FIG. 2, the charging control apparatus includes an external port connector 210 for selectively receiving a plurality of power sources, a power supply 220 for supplying power to respective parts by using a battery voltage or a power supply voltage supplied through the external port connector 210, a voltage detector 230 for detecting a voltage applied through the external port connector 210, a microcontroller 240 for variably controlling a charging current rate according to the battery voltage or the voltage detected by the voltage detector 230, a charging unit 250 for controlling the charging of the battery 260 according to the charging rate, and a display device 270 for displaying the charging state of the battery 260.

An operation of the charging control apparatus of the mobile terminal will be described below.

Referring to FIG. 2, the external port connector 210 is a universal port and used as a data port or a power source port. For example, the external port connector 210 is a universal serial bus (USB) port. In the case of a USB cable, the external port connector 210 includes a USB A type connector connected to the PC, a USB mini B type connector or 24-pin I/O connector connected to a set. The adaptor supports the USB A type connector. Accordingly, when the USB A type connector is supported, the external port connector 210 acting as a single power source can use both the USB port and adaptor power.

The external port connector 210 can be connected to the USB connector and the USB connector basically includes four pins. That is, the USB connector includes one power pin (VBUS), two data pins (D+, D−), and one ground pin. The power pin (VBUS) is supplied with power (e.g., 5V, 500 mA) supplied from the PC or host device. In this embodiment, the power pin (VBUS) is supplied with power from the PC or host device or adaptor power. The data pins (D+, D−) are data paths for data reception/transmission from/to the PC or host device.

When the external port power or adaptor power is supplied through the external port connector 210, the voltage detector 230 detects an external input voltage and transmits it to the microcontroller 240. Also, the voltage detector 230 checks a current voltage (Vb) of the battery 260 and notifies it to the microcontroller 240. The voltage detector 230 functions as an analog-to-digital converter (ADC), and converts an input voltage into a digital signal and then transmits the digital signal to the microcontroller 240.

When the input voltage is detected, the microcontroller 240 variably controls the charging current rate of the battery 260 through the charging 250 at two or more stages. Such a microcontroller 250 is operated by the power supply 220. When there is no supply of the external power, the power supply 220 supplies power to the microcontroller 240 and the respective parts of the system by using the battery power. When there is the supply of the external power, the power supply 220 supplies the microcontroller 240 and the respective parts of the system with the power inputted from the external port connector 210.

When the external voltage applied through the voltage detector 230 is higher than a predetermined voltage, the microcontroller 240 changes to an external port connection mode and then checks whether or not data are inputted through an external connection port. At this point, when the data are inputted, the data are recognized through the external connection port and the microcontroller 240 changes to a file transmission mode and changes to an external port charging mode. However, when the data is not inputted, the microcontroller 240 changes to an adaptor charging mode.

The microcontroller 240 checks for a predetermined time (e.g., max 1 sec) whether or not data are received from the computer or host device, and determines whether or not the USB power is inputted to the external port. As the checking result, when the data are received, the data are recognized through the USB port connection. On the contrary, when the data are not received, the data are recognized using the adaptor power. When changing to the adaptor mode, the charging and the power-on operation of the mobile terminal are supported.

In other words, when the USB power is inputted, the microcontroller 240 waits for a predetermined time so as to determine whether or not the data signals (D+, D−) are received from the PC. When there are the data signals, the data signals are recognized using the USB power. On the contrary, when there are no data signals, an interrupt is generated and the microcontroller 240 enters the adaptor charging mode using the interrupt.

After changing to the charging mode, the microcontroller 240 checks the battery voltage. That is, the microcontroller 240 checks a current voltage of the battery 260, which is inputted from the voltage detector 230. When the battery voltage (Vb) is lower than a first reference voltage, the charging unit 250 is set to a first charging current. When the battery voltage (Vb) is higher than the first reference voltage, the charging unit 250 is set to a second charging current or a third charging current, depending on the charging mode. The first to third charging currents have different charging current rates, whose magnitudes are as follow: first charging current<second charging current<third charging current. Here, the first reference voltage is a low voltage of the battery, which is set to 3.3 V.

The charging unit 250 performing the charging of the batter 260 using the external power according to the set charging current rate. Here, the battery is an internal battery, for example, a lithium ion battery.

Also, when the charging voltage (Vb) of the battery exceeds the first reference voltage, the microcontroller 240 sets the charging unit 250 to the second or third charging currents and then controls the charging operation.

In other words, since the adaptor power (e.g., 5V/1 A) supplies higher current than the USB power (5V/500 mA), the charging current rates are differently set to the two power sources. When the adaptor power is supplied, it can be set such that the charging is achieved at a higher charging current rate.

Even if the first charging current is equally set to 100 mA so as to protect the battery, when the battery voltage exceeds the first voltage, the USB power increases the second charging current to 150 mA and the adaptor power increases the second charging current to 400 mA. Here, the second charging current can set the charging current rate in the range from a minimum 150 mA to a maximum 300 mA, and the third charging current can set the charging current rate in the range from a minimum 400 mA to a maximum 600 mA.

Also, when the battery voltage is higher than the first reference voltage, that is, when the second reference voltage (e.g., higher than 1.7 V), the battery voltage is again detected and then the charging current rate of the battery can be adjusted to be higher. For example, when the battery voltage is higher than the second reference voltage, the USB power and the adaptor power can be set to 400 mA and 600 mA, respectively.

When the battery is fully charged, the microcontroller 240 stops the charging operation.

The batter power can be supplied to the device during the charging operation. However, the power is supplied using the USB power or adaptor power, without using the battery. Accordingly, since the external power is used for the charging and device operation, the battery can be charged more rapidly. Also, even when the battery of the device is in a low state (at which the device cannot be driven), the device can be normally operated through the charging and supply of device power. Here, the device is a mobile terminal and includes a unit that can reproduce digital media file or digital broadcasting.

Figure 3:
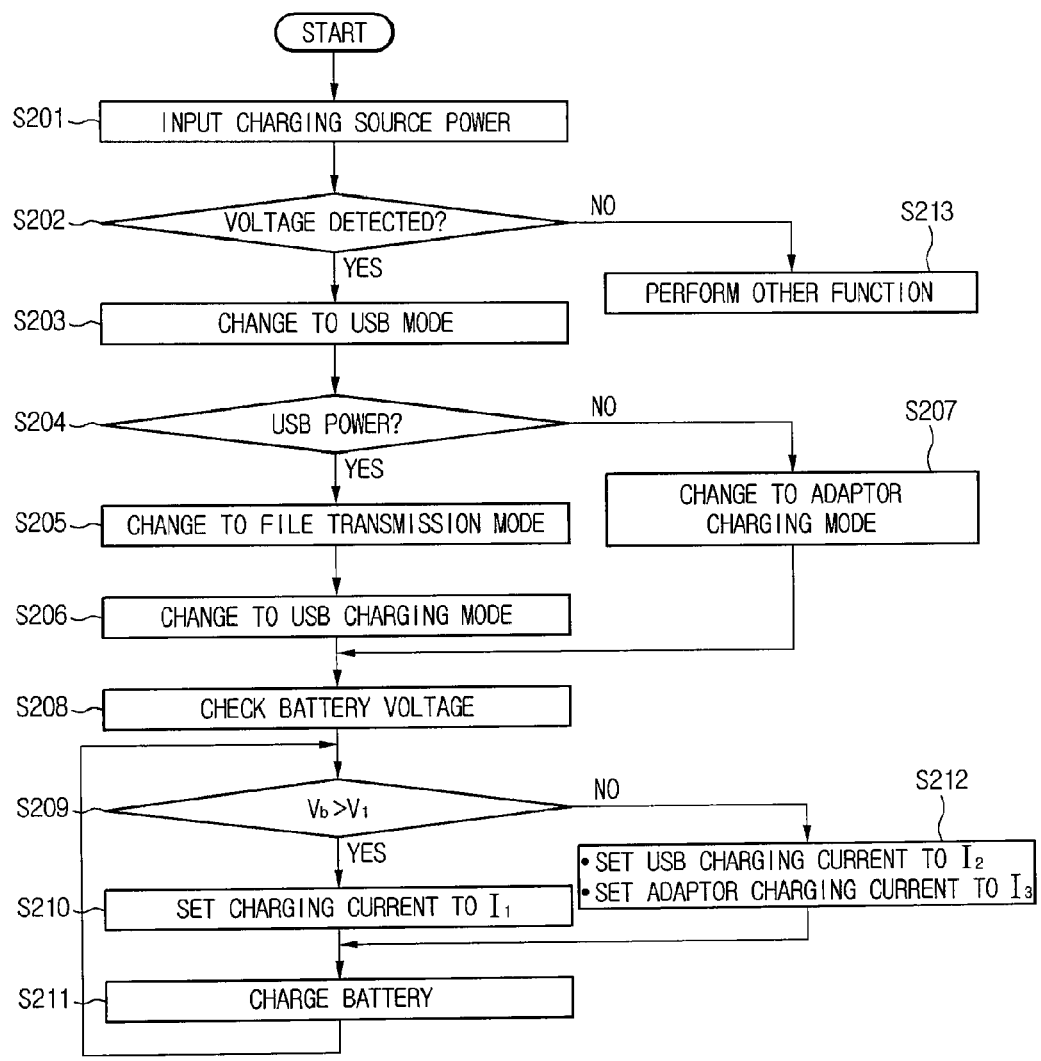
FIG. 3 is a flowchart diagram illustrating a charging control method of a mobile terminal according to an embodiment of the present invention.

FIG. 3 is a flowchart diagram illustrating a charging control method of a mobile terminal according to an embodiment of the present invention.

Referring to FIG. 3, a charging source power is inputted through an external port power or adaptor power (S201). A voltage inputted through an external port is checked (S202). When the voltage is detected, a current mode changes to a USB mode (S203). When the voltage is not detected, other function is carried out (S213). Here, since the voltage inputted through the external port is detected by configuring the USB port into a single power source rail, the voltage inputted from the USB port can be detected.

After changing to the USB mode, it is determined whether or not the USB power is supplied (S204). If the USB power is supplied, the mode changes to a file transmission mode (S205) and a USB charging mode (S206). On the contrary, when the USB power is not supplied, the mode changes to an adaptor charging mode (S207). At this point, the determination of the USB power with respect to the power inputted through an external port connector is dependent on the data input from the external port connector. When data is inputted within a predetermined time (e.g., maximum 1 second), it is recognized as the supply of the UBS power and, if not, it is recognized as the supply of the adaptor power.

If it is determined as one charging mode of the USB power or the adaptor power, a current voltage of the battery is checked (S208). AS the checking result, it is checked whether or not the battery voltage (Vb) is lower than a first reference voltage (V1) (S209). If the battery voltage (Vb) is lower than the first reference voltage, the charging current of the battery is set to a first charging current and the charging operation begins (S210, S211). If the battery voltage is higher than the first reference voltage, or if the battery voltage after the charging of the first charging current is higher than the first reference voltage, the USB charging current is set to a second charging current (S212) and the charging operation begins (S211). Also, the charging current of the battery is set to a third charging current (S213) and the charging operation begins (S211).

Here, the first charging current is charged at the same charging current rate, regardless of the USB power or the adaptor power. The magnitudes of the charging current rates satisfy the following relationship: first charging current<second charging current<third charging current. Also, the third charging current is set by more than four times the first charging current, the second charging current is set by more than 1.5 times the first charging current, and the third charging current is set by more than two times the second charging current.

Figure 4:
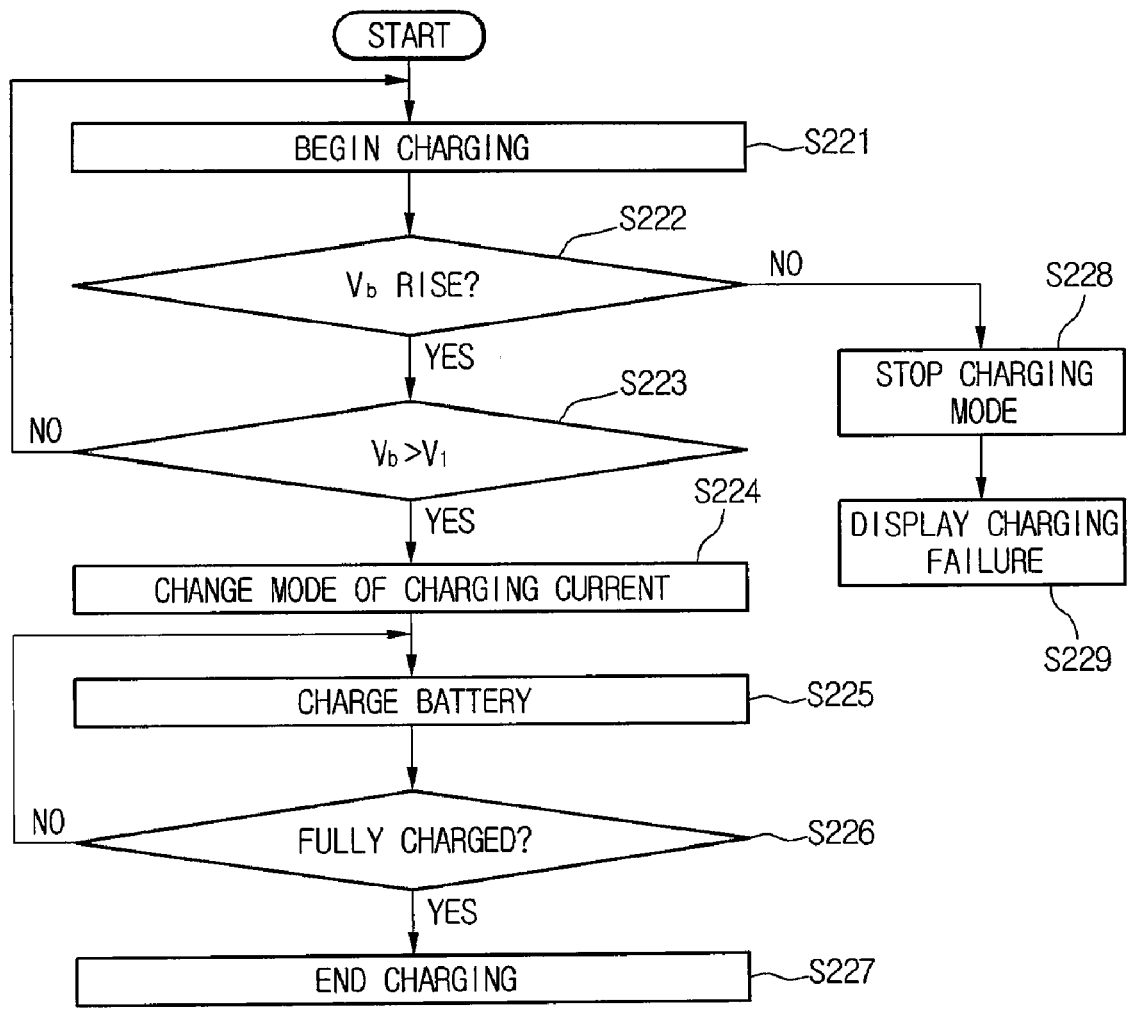
FIG. 4 is a flowchart diagram illustrating a charging control method of a mobile terminal according to another embodiment of the present invention.

FIG. 4 is a flowchart diagram illustrating a charging control method of a mobile terminal according to another embodiment of the present invention.

Referring to FIG. 4, if the charging to a predetermined charging current begins (S221), it is checked whether or not a battery voltage rises (S222). If the battery voltage does not rise, the charging mode is stopped (S228) and a charging failure is displayed on a display device (S229).

Then, it is checked whether or not the battery voltage rises and exceeds a first reference voltage (S223). If the battery voltage exceeds the first reference voltage, a mode of the charging current is changed and set (S224). The charging operation is continuously carried out (S225). It is checked whether or not the battery is fully charged (S226). If the battery is fully charged, the charging mode is terminated (S227). Here, the mode change of the charging current sets the charging current rate in proportion to a current amount of an input power source. For example, since the charging current of the adaptor power is higher than more than two times that of the USB power, the charging current rate of the adaptor power is set to be higher than two or more times that of the USB power.

Figure 5:
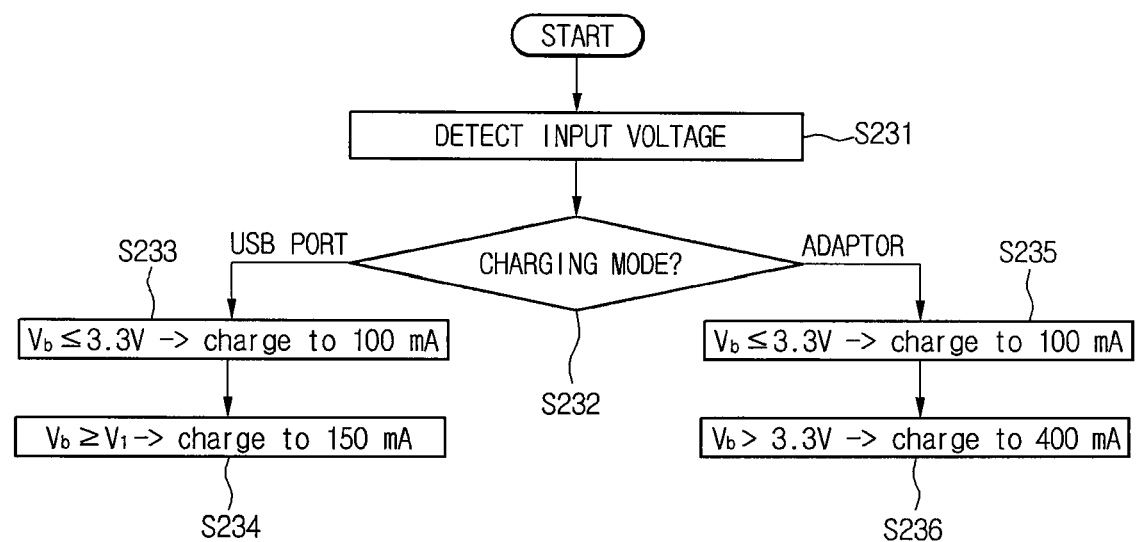
FIG. 5 is a flowchart diagram illustrating a charging control of a USB charging mode or an adaptor charging mode according to an embodiment of the present invention.

FIG. 5 is a flowchart diagram illustrating a charging control method of a mobile terminal according to another embodiment of the present invention.

Referring to FIG. 5, if an input voltage is detected (S231), a charging mode is checked (S232). In the case of a voltage of a USB port, if a battery voltage is lower than 3.3 V, the mobile terminal is charged to 100 mA (S233) and, if the battery voltage is higher than 3.3 V, the battery is charged to 150 mA (S234). In the case of a voltage of an adaptor power, if the battery voltage is lower than 3.3 V, the battery is charged to 100 mA (S235) and, if the battery voltage is higher than 3.3 V, the mobile terminal is charged to 400 mA (S236). Here, when the battery voltage is lower than 3.3 V, the battery can be charged to 100 mA, but it may not be equal according to the battery characteristic.

Figure 6:
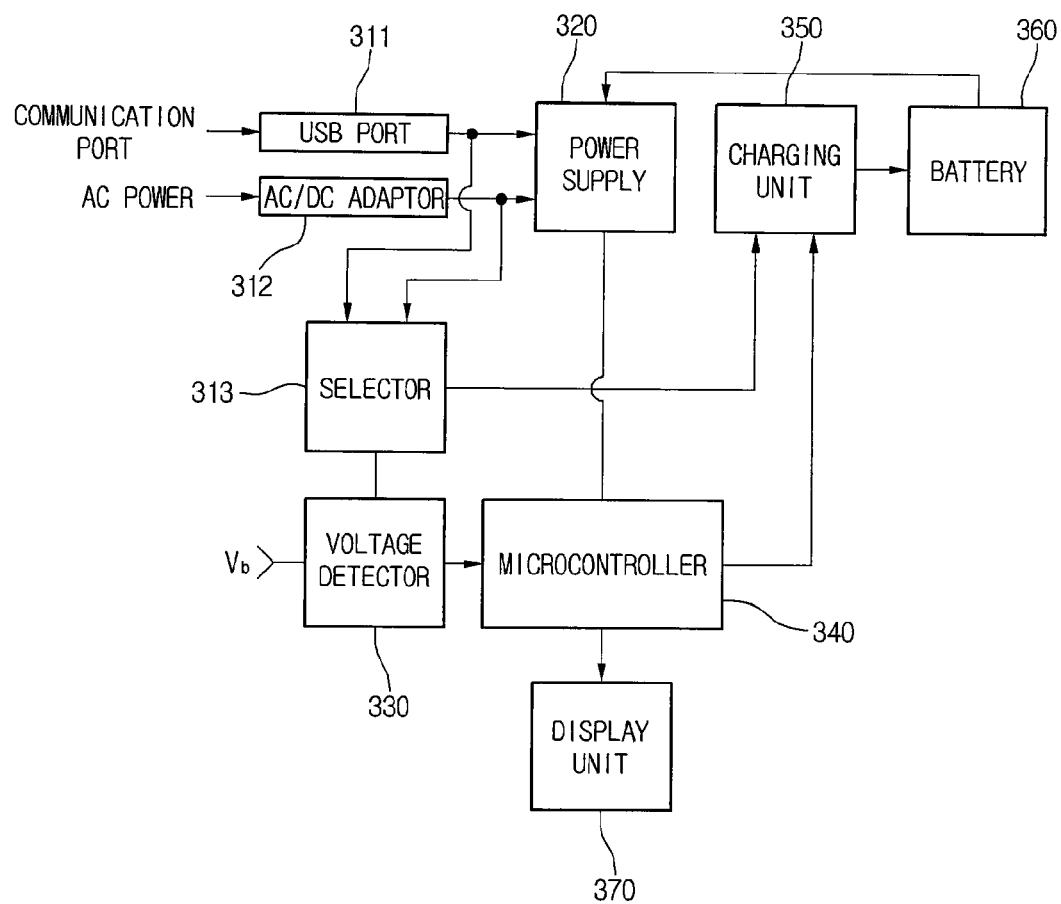
FIG. 6 is a block diagram of a charging control apparatus of a mobile terminal according to another embodiment of the present invention.

FIG. 6 is a block diagram of a charging control apparatus according to another embodiment of the present invention.

Referring to FIG. 6, the charging control apparatus includes two input power sources. Two source power inputs are a USB port 311 and an AC/DC adaptor 312. The charging control apparatus further includes a selector 313 for selecting one of the two source power inputs.

The selector 313 selects one of input voltages from the dependent two power sources and outputs it to a voltage detector 330. When the selector 313 selects one power source, it can select a higher voltage of the input power sources, or select one power source under control of a microcontroller 340, or select a power source in association with a switching operation of a power supply 320.

The voltage detector 330 detects the external input voltage and the battery voltage (Vb) and transmits the detected voltage to the microcontroller 340. The microcontroller 340 controls the charging current rate of a charging unit 350 by using the USB power, adaptor power, and the battery power, and controls the charging current rate of the charging unit 350. For example, in the case of the USB power, if the battery voltage is lower than a first reference voltage, it is set to a first charging current that is a minimum charging current. If the battery voltage is higher than the first reference voltage, it is set to a second charging current and then the charging operation is carried out. In the case of the adaptor power, if the battery voltage is lower than the first reference voltage, it is set to the first charging current. If the battery voltage is higher than the fire reference voltage, it is set to a third charging current. Since these charging control operations are equal to those of FIG. 2, a detailed description thereof will be omitted.

Even when a plurality of input power sources are used, the input power sources are determined and a charging current rate is set according to the input power source and battery voltage. If the battery voltage exceeds the predetermined reference voltage, the charging is performed at different charging current rates with reference to the input power source.

In this manner, when the mobile terminal is charged using the USB power or adaptor power, the battery charging time can be reduced by adjusting the charging current rates depending on the battery voltage. Specifically, in the adaptor charging mode, the charging time in a large-capacity battery can also be reduced by setting the charging current rate to 400-600 mA or more.

According to the present invention, the battery charging time can be reduced by charging the battery at different charging current rates.

Also, the battery charging time can be reduced by automatically distinguishing the charging modes according to the external input power and changing the charging current rate according to the distinguished charging modes.

It will be apparent to those skilled in the art that various modifications and variations can be made in the present invention. Thus, it is intended that the present invention covers the modifications and variations of this invention provided they come within the scope of the appended claims and their equivalent.

What is claimed is:

1. A charging control apparatus of a mobile terminal, comprising:
   a battery;
   an external port connector operatively coupled to plural ports configured to be operatively coupled to corresponding plural power sources, the external port configured to receive power from one power source of the plural power sources through a corresponding port;
   a voltage detector configured to detect a voltage inputted from the one power source, and a voltage of the battery;
   a microcontroller configured to perform operations comprising:
      determining the port to which the one power source is operatively coupled, through which the external port connector receives power,
      causing a charging unit to provide charging currents to charge the battery,
      establishing two or more stages to provide charging currents,
      changing the charging currents provided to the battery, wherein a charging current at a first stage is based on the detected input voltage received from the determined port and a charging current at a second stage is based on the detected battery voltage of the battery being charged; and
   the charging unit operatively coupled to the microcontroller configured to control a charging of the battery according to the charging current changed by the microcontroller.

2. The charging control apparatus according to claim 1, wherein the port is a USB port.

3. The charging control apparatus according to claim 1, wherein the port is an adaptor.

4. The charging control apparatus according to 1, wherein, in the first stage, the microcontroller is further configured to perform operations comprising causing the charging unit to change the charging current provided to the battery from a first current to a second current, wherein a value of the second current is based on the port.

5. The charging control apparatus according to claim 4, wherein the port is a USB port, and wherein the value of the second current is 1.5 times more than a value of the first current.

6. The charging control apparatus according to claim 4, wherein, in the second stage, the microcontroller is further configured to perform operations comprising causing the charging unit to change the charging current provided to the battery from the second current to a third current based on the detected battery voltage.

7. The charging control apparatus according to claim 6, wherein the charging a value of the third current is more than four times the value of the first current.

8. The charging control apparatus according to claim 1, wherein when the port is a USB port configured to receive data, the microcontroller further configured to perform operations comprising checking, for a period of time, if data is received from the source.

9. A charging control apparatus of a mobile terminal, comprising:
   a battery;
   a voltage detector configured to detect a voltage inputted through one of a USB port and an adaptor, and a voltage of the battery;
   a microcontroller configured to perform operations comprising:
      determining if the voltage detected by the voltage detector is inputted through the USB port or the adaptor, and
      providing plural charging current rates based on the voltage of the battery and based on whether the voltage is determined to be input through the USB port or the adaptor, wherein differences between the plural charging current rates if the voltage is inputted through the USB port is different from differences between the plural charging current rates if the voltage is inputted through the adaptor; and
   a charging unit configured to perform operations comprising:
      receiving the plurality of charging current rates provided by the microcontroller, and
      charging the battery by providing the plurality of charging current rates.

10. The charging control apparatus according to claim 9, further comprising a port connector coupled to the voltage detector and coupled to both the USB port and the adaptor.

11. The charging control apparatus according to claim 10, wherein the port connector is coupled to the voltage detector with a single source power rail.

12. The charging control apparatus according to claim 9, wherein the microcontroller is further configured to perform operations comprising:
   checking if input received from the one of the USB port or the adaptor includes data signals; and
   upon determining that the input does not include data signals, determining that the port through which the voltage is inputted is the adaptor.

13. A charging control method of a mobile terminal, comprising:
   receiving a signal to charge a battery, the signal inputted through an external port coupled to a USB port and an adaptor;
   in response to the receiving, checking a voltage of a battery;
   checking if the signal is received through the USB port or the adaptor;
   upon determining that the signal is received through the USB port rather than the adaptor:
      charging the battery by providing a first current to the battery, and
      increasing the first current to one of a second current and to a third current selected based on the voltage of the battery during charging and reference voltages; and
   alternatively, upon determining that the signal is received through the adaptor rather than the USB port:
      charging the battery by providing the first current to the battery, and
      increasing the first current to one of a fourth current and to a fifth current selected based on the voltage of the battery during charging and reference voltages, wherein the fourth current is greater than the second current, and the fifth current is greater than the third current.

14. The charging control method according to claim 13, wherein charging the battery upon determining that the signal is received through the USB port includes:
   based on the voltage of the battery being determined to be lower than a first reference voltage of the reference voltages, charging the battery using the first charging current;
   based on the voltage of the battery being determined to be higher than the first reference voltage, charging the battery using the second charging current; and
   based on the voltage of the battery being determined to be higher than a second reference voltage, charging the battery using the third charging current.

15. The charging control method according to claim 13, wherein the battery is an internal battery.

16. The charging control method according to claim 13, wherein the first reference voltage is a low voltage of the battery.

17. The charging control method according to claim 14, wherein the fourth charging current is 200 mA and the fifth charging current is 600 mA.

18. The charging control method according to claim 13, wherein the second charging current is 1.5 times more than the first charging current.

19. The charging control method according to claim 13, wherein the third charging current is 4 times more than the first charging current.

20. The charging control method of claim 13, further comprising upon determining that the signal is received through the USB port:
- checking if data signals are received in addition to the signal through the USB port; and
- upon determining that the data signals are not received, determining that the signal is received through the adaptor.

21. A charging control apparatus of a mobile terminal, comprising:
- a battery;
- an external port connector configured to be operatively coupled to corresponding plural power sources, the external port configured to receive power from one power source of the plural power sources;
- a voltage detector configured to detect a voltage inputted from the one power source, and a voltage of the battery;
- a microcontroller configured to perform operations comprising:
  - determining the one power source to be operatively coupled, causing a charging unit to provide charging currents to charge the battery,
  - changing variably at two or more stages the charging currents provided to the battery, wherein a charging current at a first stage is based on the detected input voltage and a charging current at a second stage is based on at least the detected voltage of the battery; and
- the charging unit operatively coupled to the microcontroller configured to control a charging of the battery according to the charging current changed by the microcontroller.

22. The charging control apparatus according to claim 21, wherein the charging current at the second stage is established based on comparing the detected battery voltage with a predetermined battery reference voltage.

23. The charging control apparatus according to claim 21, wherein the charging current at the second stage is established based on the detected input voltage, the detected battery voltage and a predetermined battery reference voltage.

24. A charging control apparatus of a mobile terminal, comprising:
- a battery;
- an external port connector configured to be operatively coupled to corresponding plural power sources, the external port configured to receive power from one power source of the plural power sources;
- a voltage detector configured to detect a voltage inputted from the one power source of the plural power sources, and a voltage of the battery;
- a microcontroller configured to perform operations comprising:
  - determining the one power source to be operatively coupled, causing a charging unit to provide charging currents to charge the battery, wherein charging currents are provided based on the detected battery voltage and based on the determined power source,
  - changing variably at two or more stages the charging currents provided to the battery, wherein the charging currents are variably established based on comparing the detected battery voltage with a predetermined battery reference voltage; and
- the charging unit operatively coupled to the microcontroller configured to control a charging of the battery according to the charging current changed by the microcontroller.

25. The charging control apparatus according to claim 24, wherein the charging currents are provided based also on a predetermined battery reference voltage.

* * * * *